3,346,632
METHOD FOR PREPARING THIOFORMAMIDE
Roger J. Tull, Metuchen, and Leonard M. Weinstock, Rocky Hill, N.J., assignors to Merck & Co., Inc., Rahway, N.J., a corporation of New Jersey
No Drawing. Filed Sept. 28, 1964, Ser. No. 399,896
7 Claims. (Cl. 260—551)

This invention relates to a method for preparing thioformamide by reaction of hydrogen sulfide with hydrogen cyanide. More particularly, it is directed to the preparation of thioformamide using hydrogen sulfide and hydrogen cyanide in the presence of base as catalyst. Still more particularly, the invention is directed to the process for preparing thioformamide from these reactants in the presence of bases, other than primary or secondary amines, having $pK_a$ values of about 5 to about 12.

Thioformamide is useful as a chemical intermediate in vitamin and pharmaceutical preparation and is presently prepared by a standard, well-known process involving the treatment of formamide with phosphorus pentasulfide. The newly invented method for synthesizing thioformamide is advantageous in that it is simpler to perform and substantially more economical than the process used in the past because it uses inexpensive starting materials.

According to the present invention, it has now been found that hydrogen sulfide and hydrogen cyanide can be combined in good yield in the presence of some bases having certain ionization properties as catalyst to form thioformamide in accordance with the process depicted below:

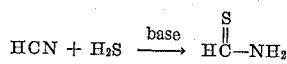

$$HCN + H_2S \xrightarrow{base} H\overset{\overset{S}{\|}}{C}-NH_2$$

It is therefore an object of the present invention to prepare thioformamide from hydrogen sulfide and hydrogen cyanide. It is a further object to provide a method for preparing thioformamide from hydrogen sulfide and hydrogen cyanide by using base catalysts other than primary and secondary amines which have ionization constants within a specific range. Other objects will be clear from the following description of the invention.

An important and critical aspect of this invention lies in the type of catalyst which may be successfully utilized. It has now been found that bases other than primary and secondary amines which have ionization constants within a certain range are capable of catalyzing the reaction between hydrogen cyanide and hydrogen sulfide to produce thioformamide. Those bases found useful for catalyzing the reaction of the invention have a $pK_a$ value in the range of about 5 to 12. It has further been found that bases other than primary and secondary amines having $pK_a$ values of from 7 to about 11 are particularly suited for catalyzing the present process for preparing thioformamide.

The term $pK_a$ is one conveniently used to describe the basicity or acidity of ionizable materials. The term is readily calculated from the ionization constant of a base ($K_b$) according to the following equation:

$$pK_a = 14 - \log \frac{1}{K_b} = 14 - pK_b$$

As used in this specification, the ionization constant $K_b$ is that constant obtained by measuring the degree of ionization of the base at 1 N concentration at 25° C.

As has already been indicated, the catalysts may be neither too strong nor too weak lest they would not allow the novel process to proceed. Additionally, the use of primary and secondary amines as catalysts is undesirable, particularly because products other than thioformamide, namely N-substituted thioformamides, will result. Compounds useful as catalysts for the process of the invention may be organic or inorganic. Examples of some of the inorganic bases useful in this process are ammonia, sodium carbonate, sodium acetate, and the like. As illustrative of some of the organic bases useful as catalysts in the present invention, there may be mentioned triloweralkyl amines such as trimethyl amine, triethyl amine, tri-n-propyl amine, triisopropyl amine and tri-n-butyl amine, aryl-substituted amines such as dimethylaniline and diethylaniline, alkenyl-substituted amines such as dimethylallyl amine and triallyl amine, nitrogen-containing heterocyclic compounds such as triethylenediamine, pyridine, and the like.

Some additional bases which find use as catalysts for the instant process as well as $K_b$ and $pK_b$ values for some of the more frequently encountered bases appear in the Handbook of Chemistry and Physics, 44th edition, pp. 1749–52 (1962–3).

The amount of catalyst to be utilized under any particular set of reaction conditions will depend upon the ionization characteristics of the catalyst, the temperature of reaction, the solvent, if any, and other factors which may effect production of the thioformamide such as pressure, time allowed for reaction, and the like.

The process of the present invention for preparing thioformamide from hydrogen sulfide and hydrogen cyanide can be carried out at any convenient pressure. The reaction may be performed at greater than atmospheric pressure by treating hydrogen cyanide, in the presence or absence of solvent, with the catalyst and treating the resulting mixture with hydrogen sulfide in a confined area under greater than atmospheric pressure. The amount of pressure utilized may be varied greatly and to some extent will be governed by the particular solvent employed, if any, and the reaction temperature, but a pressure no greater than about 300 p.s.i. is preferred. This pressure reaction can be carried out at temperatures of from about 0–150° C., although reaction temperatures in the range of from about 20–125° C. are preferred.

Alternatively, the novel process of this invention can be carried out at substantially atmospheric pressure. When this method is employed, the catalyst and hydrogen sulfide may be dissolved in the solvent and hydrogen cyanide can then be added to the mixture to form the desired thioformamide. Here too, although temperatures from about 0–150° C. may be used, temperatures of from about 20–125° C. are preferably employed.

It should be understood that the manner of bringing together the catalyst and the reactants is not of primary significance in the present invention and that the particular mode for carrying on the reaction is largely a matter of convenience and may be influenced by a change in process variables such as pressure, reaction temperature, solvent, catalyst, and the like.

The novel reaction of this invention can be readily carried out in the presence or absence of solvent. However, it will be appreciated that the use of a solvent would ordinarily allow the reaction to proceed in a normal, relatively simple manner thereby avoiding the use of extraordinary conditions, special expensive equipment, and the like. Solvents capable of use in the process of this invention include alcohols, such as loweralkanols, for example, methanol, ethanol, n-propanol, isopropanol, n-butanol, and the like, glycols, such as ethylene glycol, propylene glycol, and the like, ethers, such as ethyl ether, tetrahydrofuran, and the like, aromatic hydrocarbons such as naphthalene, benzene, toluene, xylene, and the like, aliphatic hydrocarbons such as pentane, hexane, heptane, and the like, esters such as methyl formate, ethyl formate, amyl acetate, methyl propionate, and the like, halogenides such as chloroform, dichloroethane, and the like, dimethylsulfone, dimethylformamide, dimethylsulfoxide, and similar solvents, or mixtures thereof.

The examples following are for the purpose of illustration and not by way of limitation.

Example 1

Thioformamide is prepared by using the following general procedure:

Hydrogen cyanide is added to 30 ml. of solvent at about 5° C. Catalyst is added and the mixture is then saturated with hydrogen sulfide under pressure and maintained at reaction temperature for a given period of time. The following table lists the process variables of 11 separate runs and the corresponding percentage yield of thioformamide obtained.

| Run | Catalyst (mole percent based on HCN) | $pK_a$ | HCN (ml.) | Temperature (° C.) | Time (hours) | Solvent (ml.) | Percent Yield (based on HCN) |
|---|---|---|---|---|---|---|---|
| 1 | NH₃ (150) | 9.25 | 4 | 25 | 3 | Methanol (50) | 10 |
| 2 | NH₃ (150) | 9.25 | 4 | 25 | 22 | do | 57 |
| 3 | NH₃ (150) | 9.25 | 4 | 25 | 46 | do | 62 |
| 4 | Triethylamine (100) | 10.76 | 3 | 25 | 2 | Methanol (19) | 7 |
| 5 | do | 10.76 | 3 | 25 | 4 | do | 18 |
| 6 | do | 10.76 | 3 | 25 | 25 | do | 48 |
| 7 | Trimethylamine (35) | 9.74 | 11 | 25 | 5.5 | Methanol (50) | 85 |

When methanol or isopropanol is used as solvent in the above processes, the thioformamide is recovered by evaporation of the loweralkanol, dissolving the residue in 5 ml. of water and extracting the mixture with 10 ml. of ether. The mixture is then dried and concentrated to dryness. 5 ml. of ethyl acetate at −30° C. is added to the residue. The mixture is then evaporated and the crystallized residue is filtered off, washed with 5 ml. of cold (−50° C.) ethyl acetate, and dried in a dessicator to give substantially pure thioformamide.

When benzene is used as solvent for preparing the thioformamide, the product forms a separate oil layer which is decanted and treated with 5 ml. of water. The mixture is then extracted with 10 ml. of ether and worked up to obtain substantially pure thioformamide by use of the same procedure as that used above for the loweralkanol solvent process.

Example 2

Thioformamide is prepared by saturating a solution of catalyst in solvent with hydrogen sulfide at 0° C. Hydrogen cyanide is added and the mixture is allowed to stand at 25° C. for a given period of time. The following table lists the process variables of particular runs and the corresponding percentage yield of thioformamide.

| Run | Catalyst (mole percent based on HCN) | $pK_a$ | HCN (ml.) | H₂S Pressure (p.s.i.) | Temperature (° C.) | Time (hours) | Solvent | Percent Yield (based on HCN) |
|---|---|---|---|---|---|---|---|---|
| 1 | NH₃ (100) | 9.25 | 4 | 200 | 50 | 1 | Isopropanol | 52 |
| 2 | NH₃ (100) | 9.25 | 4 | 200 | 50 | 2 | Methanol | 56 |
| 3 | Triethylamine (100) | 10.76 | 6 | 200 | 50 | 1 | do | 49 |
| 4 | Triethylamine (5) | 10.76 | 4 | 250 | 20 | 16 | Benzene | 47 |
| 5 | Triethylamine (3) | 10.76 | 4 | 200 | 50 | 2 | do | 45 |
| 6 | Triethylamine (1) | 10.76 | 4 | 200 | 20 | 16 | do | 20 |
| 7 | Trimethylamine (3) | 9.74 | 4 | 200 | 20 | 16 | do | 34 |
| 8 | do | 9.74 | 4 | 200 | 50 | 2 | do | 43 |
| 9 | Trimethylamine (10) | 9.74 | 4 | 200 | 20 | 16 | do | 52 |
| 10 | Trimethylamine (100) | 9.74 | 4 | 200 | 20 | 16 | do | *62 |
| 11 | Triethylenediamine (3) | 8.2 | 4 | 200 | 50 | 2 | do | 43 |

*Average of two runs.

It should be understood that although this invention has been described with reference to particular embodiments thereof, changes and modifications may be made which are within its intended scope and it should be limited only by the language of the appended claims.

What is claimed is:

1. The process for preparing thioformamide which comprises treating hydrogen cyanide with hydrogen sulfide at a temperature of about 0–150° C. and in the presence of a base, said base being other than a member of the group consisting of primary amine and secondary amine and having a $pK_a$ value of 5–12.

2. The process for preparing thioformamide which comprises treating hydrogen cyanide with hydrogen sulfide at a temperature of about 0–150° C. and in the presence of a base, said base being other than a member of the group consisting of primary amine and secondary amine and having a $pK_a$ value of 7–11.

3. The process for preparing thioformamide which comprises treating hydrogen cyanide with hydrogen sulfide at a temperature of about 0–150° C. and in the presence of an organic base, said base being other than a member of the group consisting of primary amine and secondary amine and having a $pK_a$ value of 7–11.

4. The process for preparing thioformamide which comprises treating hydrogen cyanide with hydrogen sulfide at a temperature of about 0–150° C. and in the presence of a tertiary amine having a $pK_a$ value of 5–12.

5. The process for preparing thioformamide which comprises treating hydrogen cyanide with hydrogen sulfide at a temperature of about 0–150° C. and in an aromatic hydrocarbon in the presence of a tertiary amine having a $pK_a$ value of 7–11.

6. The process for preparing thioformamide which comprises treating hydrogen cyanide with hydrogen sulfide at a temperature of about 0–150° C. and in the presence of ammonia substantially in the absence of a member of the group consisting of primary amine and secondary amine.

7. The process of claim 6 wherein the reaction is conducted in a lower alkanol solvent medium.

References Cited

UNITED STATES PATENTS 2,280,578   4/1942   Hanford et al. _____ 260—551
2,806,879   9/1957   Kaiser et al. _____ 260—551

OTHER REFERENCES

Bernthsen: Ber., vol. 10, pages 36–38 (1877).
Kindler: Ann. der Chemie, vol. 431, pages 202–205.
Fairfull et al.: J. Chem. Soc., 1952, pages 742–43.

WALTER A. MODANCE, *Primary Examiner*.
JOHN D. RANDOLPH, *Examiner*.
H. I. MOATZ, *Assistant Examiner*.